(12) United States Patent
Stoll

(10) Patent No.: US 8,459,723 B2
(45) Date of Patent: Jun. 11, 2013

(54) BODY SEAL AND INNER TRIM MODULE

(75) Inventor: Steve Stoll, Rochester, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 598 days.

(21) Appl. No.: 12/601,299

(22) PCT Filed: May 22, 2008

(86) PCT No.: PCT/US2008/064450
§ 371 (c)(1),
(2), (4) Date: Nov. 23, 2009

(87) PCT Pub. No.: WO2008/147833
PCT Pub. Date: Dec. 4, 2008

(65) Prior Publication Data
US 2010/0164248 A1    Jul. 1, 2010

Related U.S. Application Data

(60) Provisional application No. 60/931,222, filed on May 22, 2007.

(51) Int. Cl.
*B60J 5/00* (2006.01)
(52) U.S. Cl.
USPC ........................................ 296/146.7; 49/502
(58) Field of Classification Search
USPC ............ 296/146.7, 146.9, 146.5, 155; 49/502
See application file for complete search history.

(56) References Cited

U.S. PATENT DOCUMENTS

| | | | |
|---|---|---|---|
| 5,866,232 A | 2/1999 | Gatzmanga | |
| 5,899,522 A * | 5/1999 | DeRees et al. | 296/181.2 |
| 5,947,547 A | 9/1999 | Deeko et al. | |
| 6,119,406 A | 9/2000 | Gulisano et al. | |
| 6,210,613 B1 | 4/2001 | Stein et al. | |
| 6,422,640 B2 * | 7/2002 | Whitehead et al. | 296/146.7 |
| 6,659,536 B1 | 12/2003 | Chamberlain et al. | |
| 6,669,267 B1 | 12/2003 | Lynam et al. | |
| 6,932,415 B1 * | 8/2005 | Van Houzen et al. | 296/146.2 |
| 6,979,047 B2 | 12/2005 | Lin et al. | |
| 6,997,505 B2 * | 2/2006 | Dry et al. | 296/146.7 |
| 7,131,685 B2 | 11/2006 | Carrier | |
| 8,127,499 B2 * | 3/2012 | Iacovoni et al. | 49/441 |
| 2004/0189044 A1 * | 9/2004 | Nagata | 296/146.9 |

OTHER PUBLICATIONS

International Search Report and Written Opinion for PCT/US2008/064450.

* cited by examiner

*Primary Examiner* — Glenn Dayoan
*Assistant Examiner* — Pinel Romain
(74) *Attorney, Agent, or Firm* — Fay Sharpe LLP

(57) ABSTRACT

A body sealing system for an associated automotive vehicle door that has an associated door panel (including a sliding door, lift gate, or tailgate) includes a trim panel dimensioned to overlie at least a portion of the associated door panel, an interconnecting means connected to the trim panel and extending from adjacent a periphery of the trim panel, and a sealing member secured to the trim panel via the interconnecting means. An associated method of assembling a trim panel and seal to an associated automotive vehicle door includes providing an automotive sealing system, providing a trim panel, and integrating the seal with the trim panel.

18 Claims, 6 Drawing Sheets

PROPOSAL

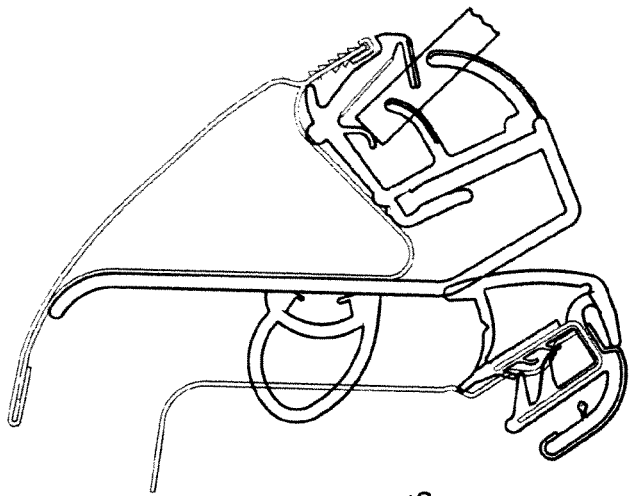
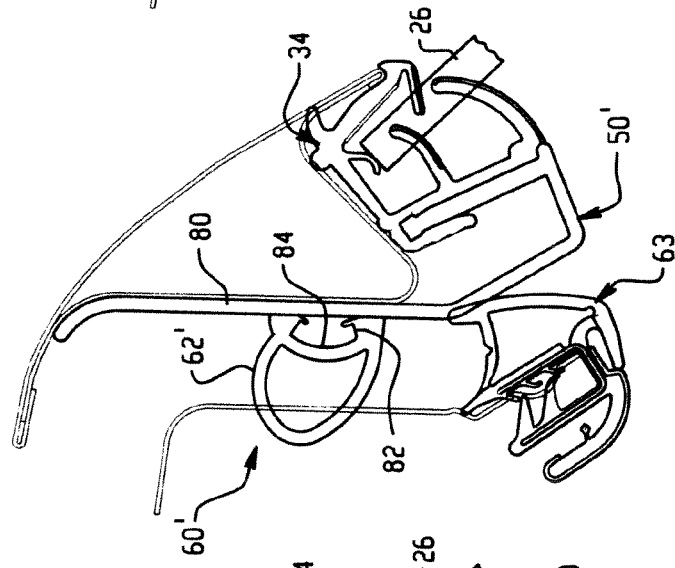
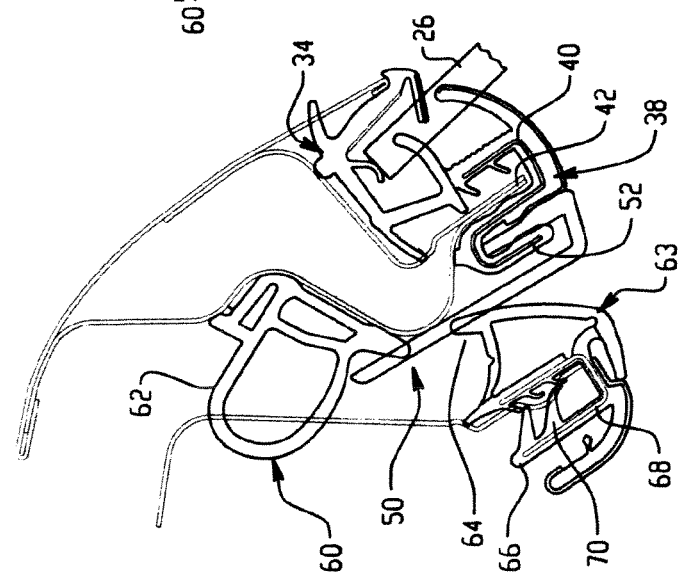

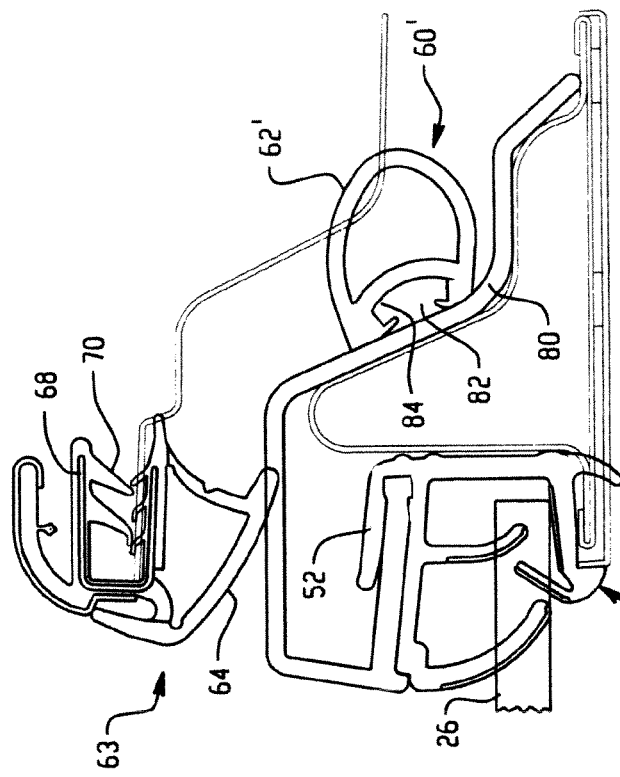
Fig. 4B PROPOSAL
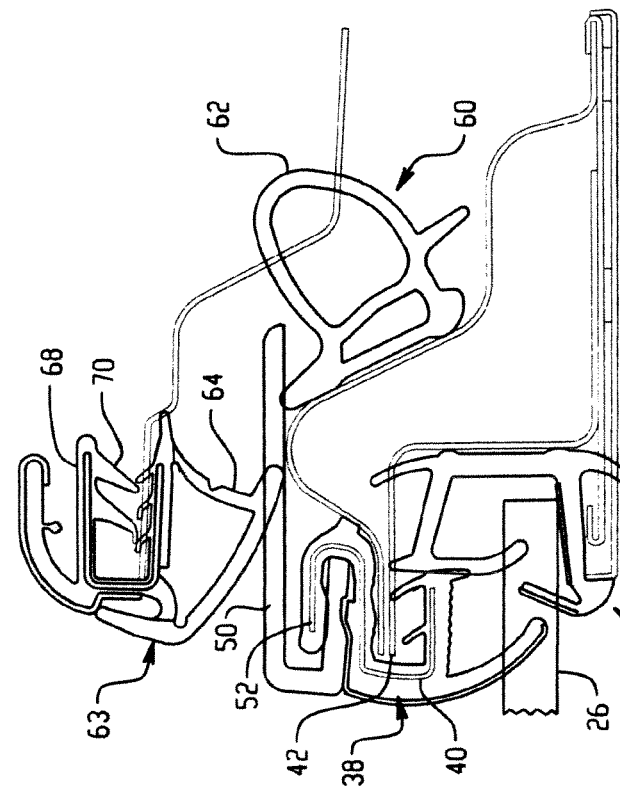
Fig. 4A CURRENT

PROPOSAL

CURRENT

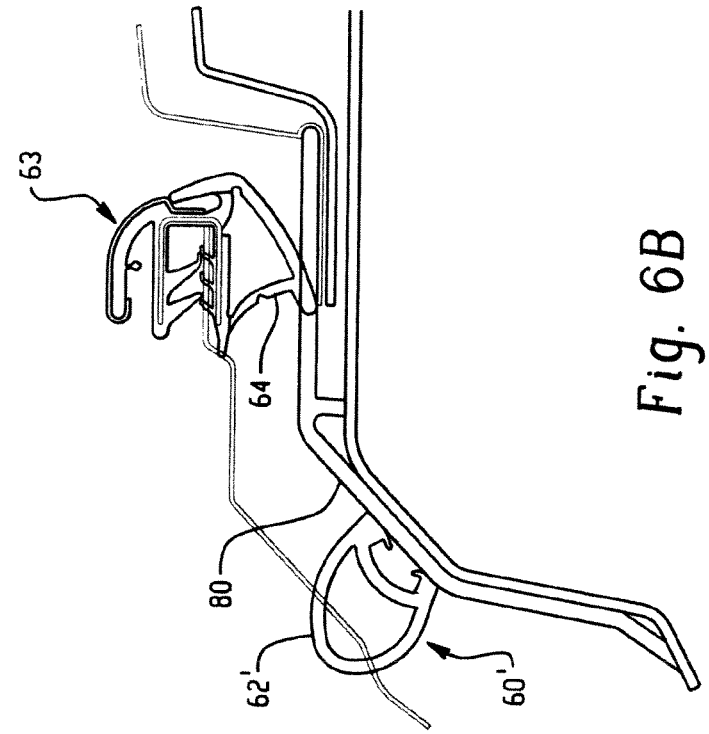
Fig. 6B PROPOSAL
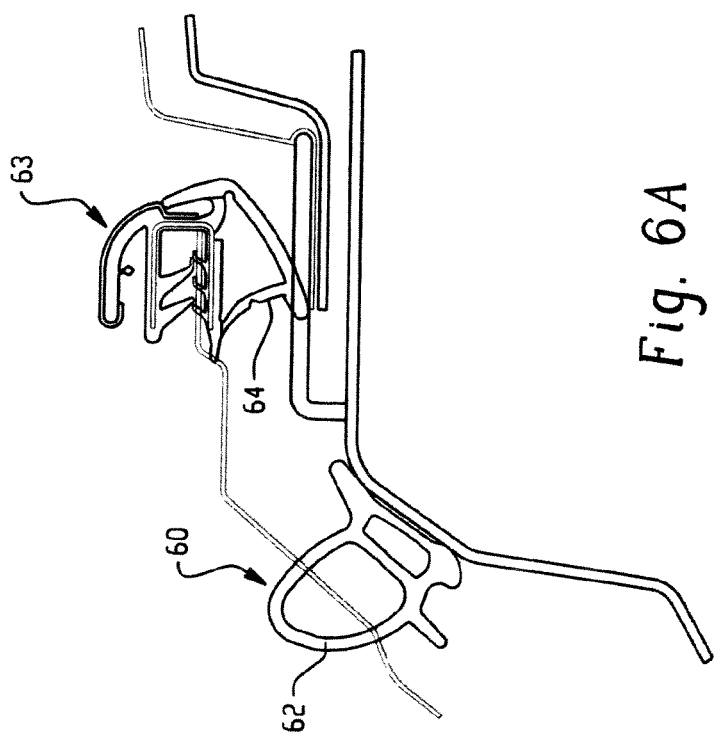
Fig. 6A CURRENT

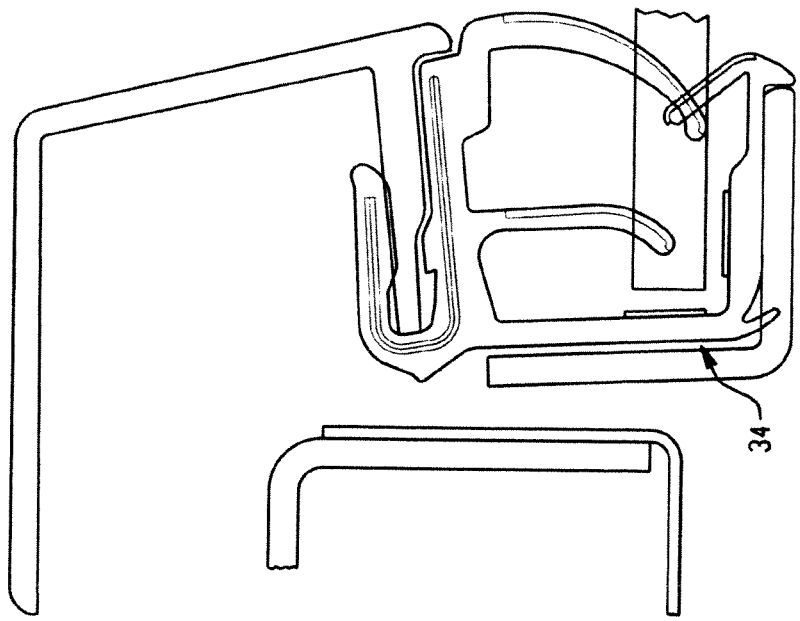
Fig. 7B PROPOSAL
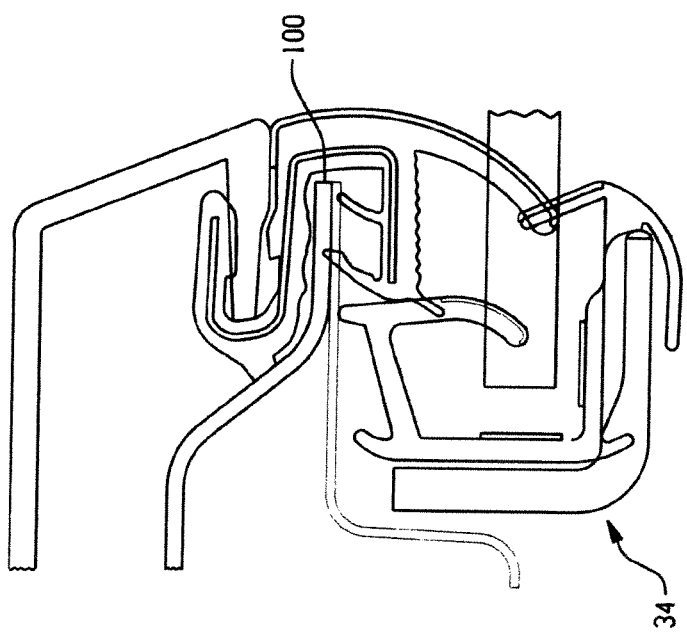
Fig. 7A CURRENT

BODY SEAL AND INNER TRIM MODULE

This application claims priority from U.S. provisional application Ser. No. 60/931,222, filed May 22, 2007, the disclosure of which is expressly incorporated by reference.

BACKGROUND

This disclosure relates to body sealing components and particularly incorporating a seal assembly with an inner trim panel. It will be appreciated, however, that the disclosure has broader implications particularly with reducing the costs of an inner door panel or inner sheet metal, or potentially eliminating the inner door panel in its entirety.

Automotive vehicle manufacturers are always seeking to reduce the cost of manufacturing a vehicle. In particular, a large component of the cost relates to assembly of the vehicle. Installing door mounted primary seals, for example, is extremely labor intensive and consequently adds significant cost to the vehicle. The same applies to other automotive sealing system components such as inner belts, glass runs, secondary or auxiliary seals such as rocker or dust seals, cut lines (fin-type seals) for example along A pillar and B pillar locations, etc. In an effort to reduce the amount of labor required to install these components, alternative arrangements for mounting the seal components are always desired.

Additionally, a great amount of time, money, and tooling is spent by the original equipment manufacturer (OEM) to stamp an inner panel of a vehicle door. Great precision is required in the tooling and stamping process so that no wrinkles or creases develop around the tight radii so as to present a pleasingly aesthetic surface. Further, locations where there are deep draws in the door panel are another source of increased cost. Inner door panels are usually provided for structure and assembly convenience. Thus, eliminating the need for precision and door appearance can result in significant savings for the OEM or eliminating the need for the structure or assembly of an inner door panel.

Thus, a continued need exists for an improved inner trim panel and sealing components that address one or more of the drawbacks noted above.

BRIEF SUMMARY OF THE DISCLOSURE

A body sealing system for an associated automotive vehicle door that has an associated door panel (including a sliding door, lift gate, or tailgate) includes a trim panel dimensioned to overlie at least a portion of the associated door panel, an interconnecting means connected to the trim panel and extending from adjacent a periphery of the trim panel, and a sealing member secured to the trim panel via the interconnecting means.

The interconnecting means is preferably a plastic substrate that overlies at least a portion of the door panel.

The interconnecting means is a separate plastic member mechanically secured along one portion to the trim panel.

The body seal may be extruded on the interconnecting means, dual injected with the trim panel, or formed as a separate component and then separately, mechanically connected (including tape or adhesive) to the interconnecting means.

The trim panel and interconnecting means cover substantially an entire interior surface of the door panel.

A method of assembling a trim panel and seal to an associated automotive vehicle door includes providing an automotive sealing system, providing a trim panel, and integrating the seal with the trim panel.

An integrating step includes extruding the seal on the trim panel.

The integrating step may alternatively include molding the seal on the trim panel.

The integrating step includes securing the seal to the trim panel via a mechanical connection prior to installing the trim panel to a door panel.

A primary benefit relates to reduced cost in the assembly plant.

Another benefit relates to the decreased labor required to install the seal.

Yet another benefit resides in the decreased cost associated with stamping the inner panel.

Still another benefit may be found in potentially eliminating the inner door panel in its entirety.

A still further benefit resides in the improved appearance or styling that may be achieved.

Still other benefits and advantages of the disclosure will become apparent to those skilled in the art upon reading and understanding the following.

BRIEF DESCRIPTION OF THE DRAWINGS

FIGS. 3A, 3B, and 3C are sectional views taken generally along lines 3-3 of FIG. 1, FIG. 3A illustrating the prior art arrangement, and FIGS. 3B and 3C representing alternative embodiments according to the present disclosure.

FIGS. 4A and 4B are sectional views taken generally along lines 4-4 of FIG. 1, where FIG. 4A represents the conventional arrangement and FIG. 4B illustrates the present disclosure.

FIGS. 6A and 6B are cross-sectional views of the prior art and current proposal, respectively, taken generally along the lines 6-6 of FIG. 1.

FIGS. 7A and 7B are cross-sectional views of the prior art and present disclosure, respectively, taken generally along the lines 7-7 of FIG. 1.

DETAILED DESCRIPTION OF THE PREFERRED EMBODIMENTS

Figure 2:
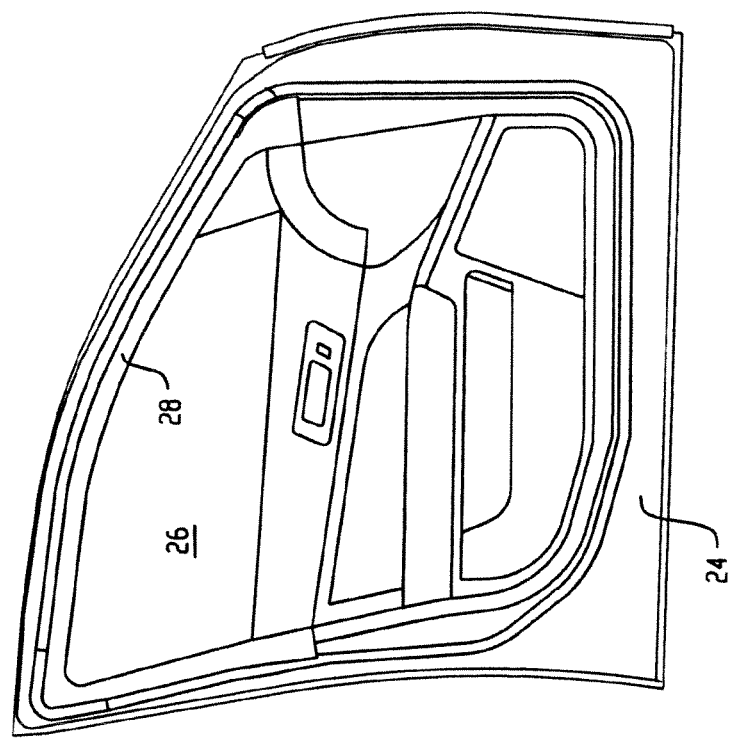
FIG. 2 is an elevational view of an interior of an automotive vehicle door.
Figure 1:
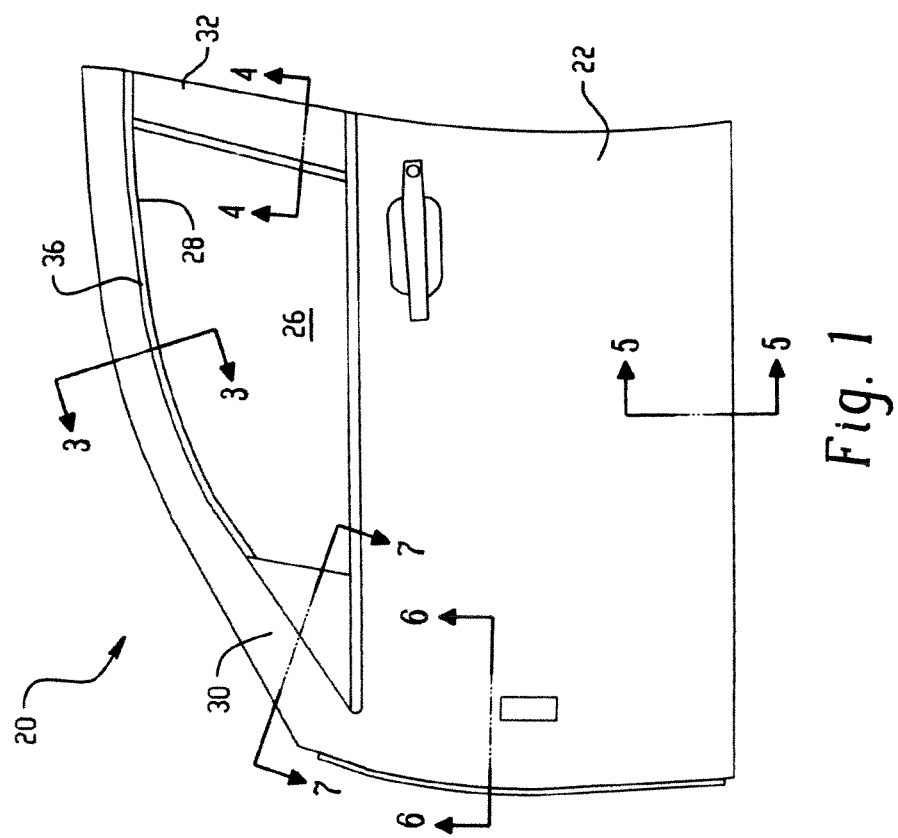
FIG. 1 is an elevational view of an exterior surface of an automotive vehicle door.

With initial reference to FIGS. 1 and 2, an automotive vehicle door 20 has a first or outer door panel 22 typically made from sheet metal, and a second or inner door panel 24 also typically a sheet metal construction. As is known in the art, the inner and outer door panels are secured together along peripheral portions thereof and define a door cavity therebetween in which selected components of the automotive vehicle are contained. For example, the window regulator, speakers, door lock assemblies, etc., are usually mounted in the door cavity so that the inner door panel serves as a structural member to which these components can be secured to the door. A movable window 26 is selectively raised and lowered by the regulator (not shown) relative to the door to close and open a window opening 28, respectively. The opening generally extends between an A-pillar or mirror sail 30 and a B-pillar 32. A glass run assembly 34 (FIGS. 3A-3C) (shown here as a generally U-shaped member having a base with first and second sidewalls dimensioned to receive an edge of the window that is engaged by seal lips extending from the sidewalls) typically engages or receives a peripheral edge of the window 26 adjacent the A-pillar (FIG. 7A) and also receives a peripheral edge of the window along the B-pillar (FIG. 4A). The particular structural and functional details of the glass run assembly 34 are well known to one skilled in the art and form no particular part of the present disclosure so that further description is unnecessary to a full and complete understanding of the present invention. In addition, along a header portion 36 of the vehicle door, the glass run assembly includes an additional weatherseal portion or garnish 38 (FIG. 3A) that may include a reinforcement member such as a core or support 40 that is often a metal member enclosed in an EPDM structure to secure the assembly to a door flange 42 formed where the inner and outer door panels of the door are secured together. Again, the general structure and function of the garnish is well known so that further description herein is unnecessary.

A trim member 50 extends from a U-shaped portion of the garnish. The trim member 50 is secured in place by a reverse-bend portion 52 of the core and extends along an edge portion of the door inner panel. As is evident, the trim panel may overlap a portion of a primary door seal 60 that is secured via pins/fasteners and/or adhesive tape to the door inner panel. A seal bulb portion 62 of the primary door seal is compressed when the door is closed so that the primary door seal sealingly engages the vehicle body when the door is closed and seals the interior of the vehicle from the weather elements.

A secondary or auxiliary seal 63 may be provided on the vehicle body with a seal portion 64 extending therefrom for selective sealing engagement with the trim member 50 when the vehicle door is closed. If desired, the secondary seal may be secured to the vehicle body via a conventional U-shaped gripping portion 66 that may include a core or support 68 with gripping arms 70 extending into the cavity for engaging receipt with the vehicle body flange.

A comparison of FIG. 3A with FIGS. 3B and 3C illustrates the extension of the trim member 50' so that the trim member forms an interconnecting portion 80 that engages the primary door seal 60'. The interconnecting portion is shown as including a mushroom-shaped connecting member received in a similarly dimensioned recess 82 in the base of the primary door seal for mechanically attaching the primary door seal to the trim member. It will be appreciated that other mechanical connections may be used without departing from the scope and intent of the present invention, and likewise the term "mechanical engagement" is also intended to encompass tape or adhesive.

FIG. 4B shows a similar extension of the trim member 50' to form an interconnecting portion 80 that mechanically engages the primary door seal 60'. It is further evident that the trim member may also extend beyond the primary door seal as represented in order to cover further surface portions or regions of the inner door panel that would otherwise show or be apparent when the door is open. In this manner, the interconnecting portion of the trim portion serves to cover the inner door panel and reduce the cost of the assembly and formation of the inner door panel since any creases or wrinkles may be permitted since such "imperfections" will be covered by the trim member.

Figure 5B:
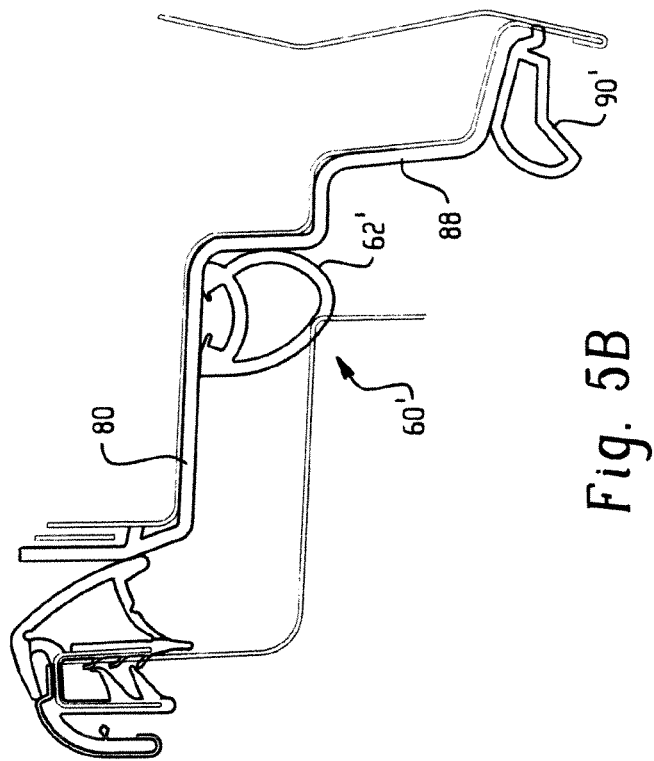
FIGS. 5A and 5B are cross-sectional views of the prior art and present disclosure, respectively, taken generally along the lines 5-5 of FIG. 1.
Figure 5A:
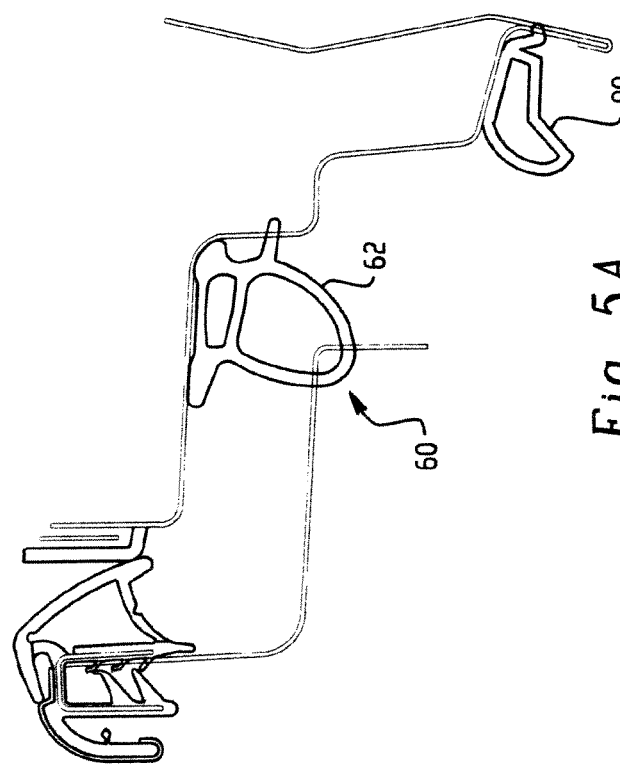

Turning to FIG. 5A, the primary door seal 60 and rocker seal 90 are individually and separately connected to the vehicle door. However, in the embodiment of FIG. 5B, the extension 80 interconnects the trim member with the primary door seal 60' and a further extension 88 engages rocker seal 90'. As is evident, rocker seal represents that the trim member may be secured to the primary door seal or rocker seal in alternative manners such as tape/adhesive or pins. Likewise, the seals may be separately extruded or molded from the trim member and then mechanically connected to the interconnecting portion or extension of the trim member, or fusion bonded (sonically welded) to the trim member. As seen in FIG. 5B, the seals may alternatively be integrally formed to the trim member such as by extruding the seal onto the trim member or molding the seal thereto in a dual shot molding operation.

A side-by-side comparison of FIG. 6A with FIG. 6B again demonstrates the extension of the trim member 50' via interconnecting portion 80 to connect the primary door seal 60" with the trim member. Again, the trim member may also extend well past the point of interconnection with the primary door seal to cover other portions of the inner door panel if so desired.

FIGS. 7A and 7B show an alternative door structure that can be achieved with the extended trim member. The conventional weld flange 100 of FIG. 7A is eliminated in FIG. 7B, thereby reducing the amount of core material to support the glass run portion in the embodiment of FIG. 7B in the region of the mirror sail.

As is apparent, the present disclosure teaches an effective manner of shipping all or some of the body sealing components on the inner trim panel. For example, the rocker seal, inner glass run channel, inner belt strip, and inner auxiliary seal could all be shipped into the OEM plant as part of one module. This eliminates the need to individually install each of these components. This can be achieved by subassembly of the seal to the trim panel or dual injecting the seals on the trim panel substrate. Similarly, the module can incorporate other vehicle components such as the window regulator, speakers, door lock mechanisms, mirror controls, etc. any or all of which can be mounted to the module prior to shipping the module to the OEM assembly plant for installation/assembly in the vehicle. Totally covering the door inner panel with the trim panel allows for fewer hits to make the door inner panel. This will consequently reduce the cost of the inner door panel and supply a cleaner appearance. The disclosure can be used on all automotive doors and would be used with normal operating parameters of the automotive vehicle, and typically formed from plastic or rubber components.

It is also contemplated that the OEM may have an opportunity to eliminate the inner door panel in its entirety since the inner door panel is otherwise covered by the trim panel module. Conceptually, the trim panel covers the door panel and a rubber/plastic seal is provided on the trim panel before it is shipped into the OEM plant.

Although hinges and the door lock area may need to be redesigned, since these are interruption points about the periphery of the door, a molded mucket could easily be formed in the trim panel to accommodate these door areas. Moreover, although the above description referenced a vertically hinged door as is conventional in a sedan, the structural features and advantages find application in sliding doors, lift gates, tailgates, etc. Accordingly, the reference to a door is equally applicable to these automotive components unless specifically noted otherwise. Likewise, other vehicle components can be incorporated into the seal/inner trim module such as mounting the speakers, regulator, etc. and then shipped to the OEM as part of the module. This again reduces the number of assembly steps required by the OEM to complete assembly of the vehicle in the assembly plant. Consequently, the present disclosure should not be limited to only the vehicle seal components and inner trim panel but also include other vehicle components that can be incorporated into the seal/inner trim module.

Still another consideration is forming the completed structure shown in FIG. 2 as a multi-part arrangement (e.g., two pieces) and then subsequently securing the individual components together for shipment to the OEM as a single component assembly. For example, the body sealing system may be formed as first and second components (or more) that are divided at a preselected region such as the belt line area, and then secured together along the preselected region such as the belt line area. One preferred manner would be to fusion bond or sonically weld the individual components into a single component assembly before shipment to the OEM.

Likewise, the body sealing system may be assembled to the door while the door is separate from the vehicle body. For example, the door manufacturer could assemble the body sealing system to the door and subsequently ship the door with the body sealing system to the automotive manufacturer or OEM. Alternatively, the door without the body sealing system could be shipped to the seal manufacturer where the body sealing system would be secured to the door for subsequent shipment of the door with installed sealing system sent to the automotive manufacturer.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

Having thus described the invention, it is now claimed:

1. A body sealing system for an associated automotive vehicle door that includes an associated door panel, the sealing system comprising:
   a trim panel dimensioned to overlie the associated door panel; and
   an interconnecting portion extending from adjacent a periphery of the trim panel; and
   a door mounted seal formed separately from the trim panel secured via the interconnecting portion to the trim panel and facing in a direction outwardly from the trim panel and opposite from the associated door panel for selective sealing engagement with an associated vehicle body when the associated automotive vehicle door is closed, the seal being secured by at least one of (i) fusion bonding the seal and trim panel together, (ii) sonically welding the seal and the trim panel together, (iii) integrally forming the seal on the trim member, or (iv) mechanically engaging the seal to the trim panel.

2. The sealing system of claim 1 wherein the interconnecting portion is a plastic substrate that overlies the door panel.

3. The sealing system of claim 2 wherein the interconnecting portion is integral with the trim panel.

4. The sealing system of claim 1 wherein the seal is extruded on the interconnecting portion.

5. The sealing system of claim 1 wherein the trim panel and interconnecting portion cover substantially an entire interior surface of the door panel.

6. The sealing system of claim 1 wherein the associated automotive vehicle door further includes an associated inner door panel, and the trim panel is dimensioned to overlie the associated inner door panel.

7. The sealing system of claim 6 further comprising means for securing the trim panel to the associated inner door panel.

8. The sealing system of claim 1 further comprising means for securing the trim panel to the associated door panel.

9. A method of assembling a trim panel and seal to an associated automotive vehicle door comprising:
   providing a seal in a first forming operation;
   providing a trim panel in a second forming operation; and
   integrating the seal with the trim panel so that the seal faces in a direction outwardly from the trim panel and opposite from the associated door panel for selective sealing engagement with an associated vehicle body when the associated automotive vehicle is closed, the seal integrated with the trim panel by at least one of (i) fusion bonding the seal to the trim panel, (ii) sonically welding the seal to the trim panel, (iii) integrally forming the seal on the trim member, and (iv) mechanically engaging the seal to the trim panel.

10. The method of claim 9 further comprising mounting the trim panel to the associated automotive vehicle door.

11. The method of claim 9 wherein the mounting step occurs subsequent to the integrating step.

12. The method of claim 9 wherein the integrating step includes dimensioning the trim panel to overlie an interior of the associated door.

13. The method of claim 12 wherein the integrating step includes securing the trim panel to an inner door panel.

14. The method of claim 12 wherein the integrating step includes securing the trim panel to the door.

15. The method of claim 10 wherein the mounting step occurs while the vehicle door is separate from an associated vehicle body.

16. The method of claim 15 further comprising shipping the vehicle door with integrated trim panel and seal to an automotive manufacturer.

17. The method of claim 11 wherein the mounting step occurs while the vehicle door is separate from an associated vehicle body.

18. The method of claim 17 further comprising shipping the vehicle door with integrated trim panel and seal to an automotive manufacturer.

* * * * *